United States Patent
Schiff et al.

(10) Patent No.: US 6,233,456 B1
(45) Date of Patent: *May 15, 2001

(54) METHOD AND APPARATUS FOR ADJACENT COVERAGE AREA HANDOFF IN COMMUNICATION SYSTEMS

(75) Inventors: Leonard N. Schiff, San Diego; David S. Miller, Escondido, both of CA (US)

(73) Assignee: Qualcomm Inc., San Diego, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/722,330

(22) Filed: Sep. 27, 1996

(51) Int. Cl.$^7$ ................................................. H04Q 7/20
(52) U.S. Cl. ............................................ 455/439; 455/436
(58) Field of Search ..................................... 455/436, 422, 455/427, 429, 442, 439, 450, 456, 464, 513, 67.1, 12.1, 13.1, 13.2, 525, 440; 340/825.44, 38.3; 370/350, 331, 342

(56) References Cited

U.S. PATENT DOCUMENTS

| | | | |
|---|---|---|---|
| 5,073,900 | * | 12/1991 | Mallinckrodt ........................ 455/429 |
| 5,101,501 | * | 3/1992 | Gilhousen et al. ................... 455/442 |
| 5,235,633 | * | 8/1993 | Dennison et al. ................... 455/12.1 |
| 5,392,453 | * | 2/1995 | Gudmundson et al. ............. 455/449 |
| 5,410,728 | * | 4/1995 | Bertiger et al. ..................... 455/13.1 |
| 5,673,308 | * | 9/1997 | Akhavan ............................. 455/462 |
| 5,691,974 | * | 11/1997 | Zehavi et al. ....................... 370/203 |
| 5,697,055 | * | 12/1997 | Gilhousen et al. ................... 455/513 |
| 5,711,004 | * | 1/1998 | Blasiak et al. ...................... 455/436 |
| 5,722,068 | * | 2/1998 | Bartle et al. ........................ 455/436 |
| 5,722,073 | * | 2/1998 | Wallstedt et al. ................... 455/436 |
| 5,732,351 | * | 3/1998 | Olds et al. .......................... 455/436 |
| 5,978,365 | * | 7/1998 | Yi ....................................... 455/436 |
| 5,987,326 | * | 7/1998 | Tiedemann, Jr. et al. .......... 455/440 |

FOREIGN PATENT DOCUMENTS

| | | | |
|---|---|---|---|
| 9512296 | 5/1995 | (WO) | ............................. H04Q/7/38 |
| 9512297 | 5/1995 | (WO) | ............................. H04Q/7/38 |
| 9520865 | 8/1995 | (WO) | ............................. H04Q/7/38 |

* cited by examiner

Primary Examiner—Nay Maung
Assistant Examiner—Jean A Gelin
(74) Attorney, Agent, or Firm—Phillip R. Wadsworth; Gregory D. Ogrod

(57) ABSTRACT

A handoff technique in which system users detect transitions in service between a current service area and an adjacent service area, and request a forward link channel in the new service area when a detected signal strength for the new service area exceeds predetermined threshold levels. The forward communications link in the current service area is maintained until the strength of the new service area signal reaches a certain level and appropriate channel quality is confirmed, as based on various known criteria. Typically, service area transitions are detected using the signal strength of pilot or paging signals associated with service areas, which are used to determine a relative signal strength of new service area signals. Pilot signal level adjustments used to counter roll-off effects are detected and compensated for in comparing signal levels. To minimize the burden on system resources, new service area signals are not selectable until a minimum time has passed, or a minimum change in energy from a prior pilot signal is detected. In addition, communications using the previous service area can be dropped almost immediately upon engaging the new service area.

8 Claims, 11 Drawing Sheets

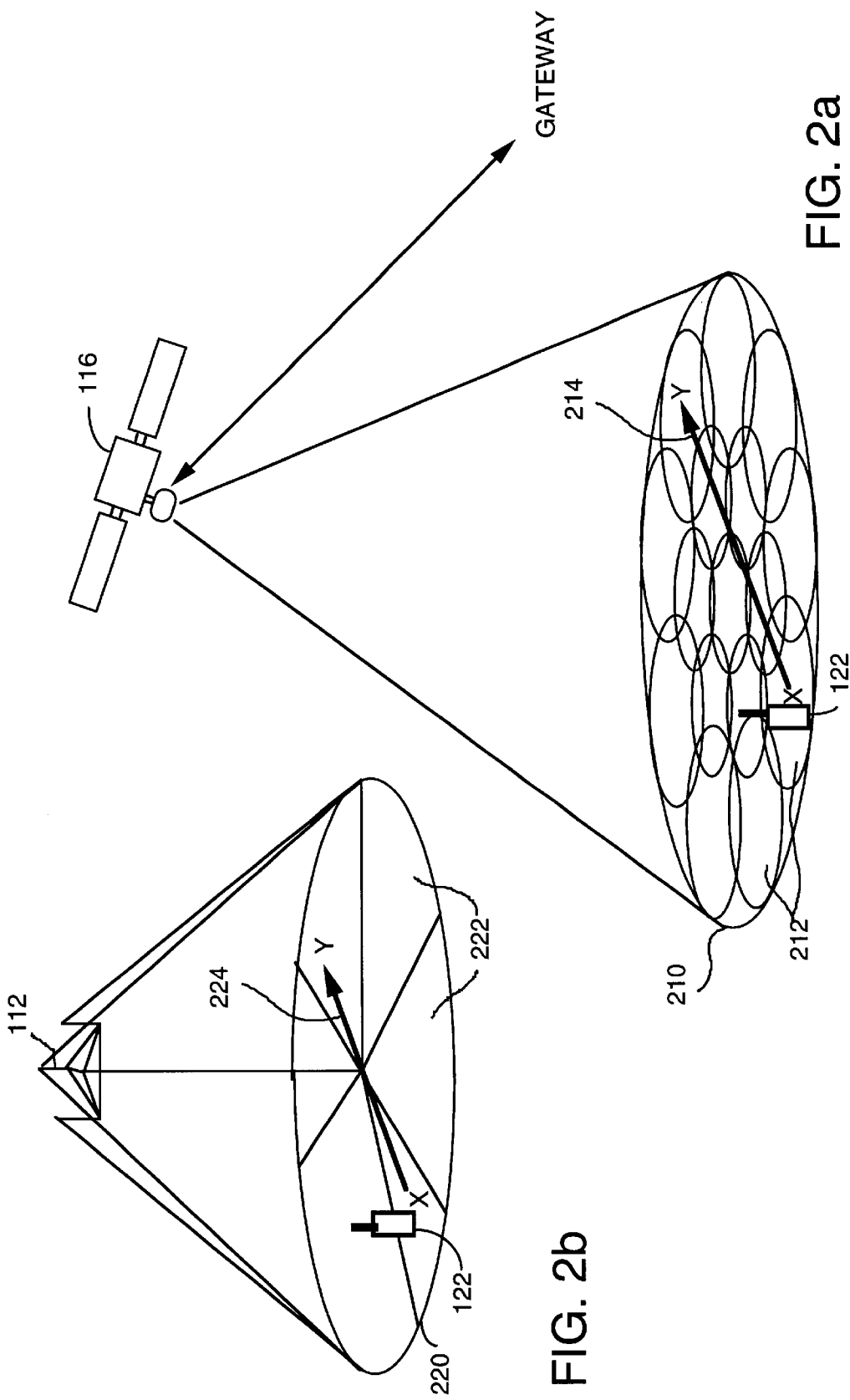

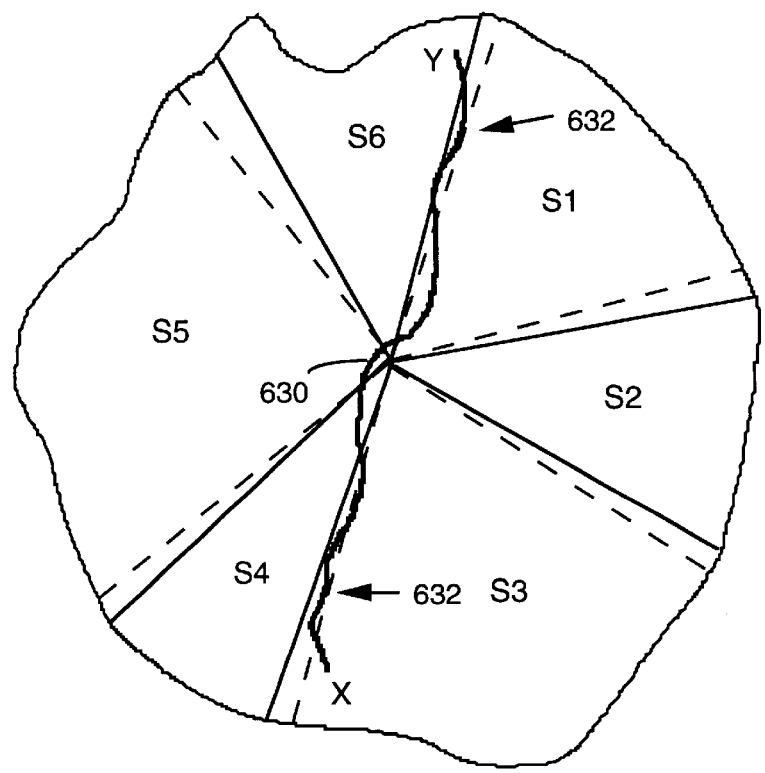
FIG. 6c  BOUNDARY FOR SECTORS $\biggl\langle \begin{matrix} 1\ 3\ 5 \\ 2\ 4\ 6 \end{matrix}$  ———
 - - -

METHOD AND APPARATUS FOR ADJACENT COVERAGE AREA HANDOFF IN COMMUNICATION SYSTEMS

BACKGROUND OF THE INVENTION

I. Field of the invention

The present invention relates to performing signal handoff in communication systems, such as wireless data or telephone systems, using satellites. More particularly, the invention relates to a method and apparatus for handing off user terminal communication links between different satellite beams associated with a single communications satellite, or sectors in a single cell.

II. Description of the Related Art

A variety of multiple access communication systems and techniques have been developed for transferring information among a large number of system users, such as code division multiple access (CDMA) spread spectrum techniques. CDMA techniques in multiple access communication systems are disclosed in the teachings of U.S. Pat. No. 4,901,307, which issued Feb. 13, 1990 under the title "Spread Spectrum Multiple Access Communication System Using Satellite Or Terrestrial Repeaters", and U.S. patent application Ser. No. 08/368,570, filed under the title "Method And Apparatus For Using Full Spectrum Transmitted Power In A Spread Spectrum Communication System For Tracking Individual Recipient Phase Time And Energy," which are both assigned to the assignee of the present invention, and incorporated herein by reference. These patents disclose communication systems in which communication signals are transferred through satellite repeaters and gateways, or terrestrial base stations (also referred to as cell-sites or cells).

In a typical spread-spectrum communication system, one or more preselected pseudorandom noise (PN) code sequences are used to modulate or "spread" user information signals over a predetermined spectral band prior to modulation onto a carrier signal for transmission as communication signals. PN spreading is a method of spread-spectrum transmission that is well known in the art, and produces a communication signal with a bandwidth much greater than that of the data signal. In the base station- or gateway-to-user communication link, PN spreading codes or binary sequences are used to discriminate between signals transmitted by different base stations or over different beams, as well as between multipath signals. These codes are typically shared by all communication signals within a given cell or beam, that are on a common frequency (sub-beam).

In a typical CDMA spread-spectrum communication system, channelizing codes are used to discriminate between different users within a cell or between user signals transmitted within a satellite sub-beam on a forward link (i.e., the signal path from the base station or gateway to the user transceiver). That is, each user transceiver has its own orthogonal channel provided on the forward link by using a unique 'channelizing' orthogonal code. Walsh functions are generally used to implement the channelizing codes.

Wide band CDMA techniques permit problems such as multipath fading to be more readily overcome and provide a relatively high signal gain. However, some form of signal diversity is also generally provided to further reduce the deleterious effects of fading and additional problems associated with acquiring and demodulating signals in the presence of relative user, or repeater, movement, which along with large distances causes substantial dynamic changes in path lengths.

Generally, three types of diversity are used in spread spectrum communication systems, including time, frequency, and space diversity. Time diversity is obtainable using repetition and time interleaving of signal components, and a form of frequency diversity is inherently provided by spreading the signal energy over a wide bandwidth.

Space or path diversity is obtained by providing multiple signal paths through simultaneous links with a user through two or more base stations or antennas, for terrestrial-based repeater systems; or two or more satellites or satellite beams, for space-based repeater systems. That is, for terrestrial systems signals can be transferred through multiple base stations, or more likely, through multiple antennas servicing various cell sectors. For satellite communication systems, path diversity is typically obtained by transferring signals over multiple paths using either multiple satellites (repeaters) or multiple transponder beams on a single satellite. However as discussed below, the latter approach is not generally useful.

Examples of using path diversity in multiple access communication systems are illustrated in U.S. Pat. No. 5,101,501 entitled "Soft Handoff In A CDMA Cellular Telephone System," issued Mar. 31, 1992, and U.S. Pat. No. 5,109,390 entitled "Diversity Receiver In A CDMA Cellular Telephone System," issued Apr. 28, 1992, both assigned to the assignee of the present invention, and incorporated herein by reference.

Typical spread spectrum communication systems also contemplate the use of a "pilot" carrier signal as a coherent phase reference for gateway- or satellite-to-user and base station-to-user links. That is, a pilot signal, which typically contains no data modulation, is transmitted by a base station or gateway throughout a given region of coverage. A single pilot is typically transmitted by each gateway or base station for each frequency used, typically referred to as a CDMA channel, or sub-beam. This pilot is shared by all user terminals receiving signals from that source. This provides signals that can be readily distinguished from each other, also distinguishing between beams and cells while providing simplified acquisition and tracking.

Pilot signals are used by subscriber units to obtain initial system synchronization, and provide robust time, frequency, and phase tracking of transmitted signals. Phase information obtained from tracking a pilot signal carrier is used as a carrier phase reference for coherent demodulation of communication system or user information signals.

Pilot signals are also generally used to gauge relative signal or beam strength for received communication signals. In many systems, pilot signals are also generally transmitted at a higher power level than typical traffic or other data signals to provide a greater signal-to-noise ratio and interference margin. This higher power level also enables an initial acquisition search for a pilot signal to be accomplished at high speed while providing for very accurate tracking of the pilot carrier phase using relatively wide bandwidth, and lower cost, phase tracking circuits.

As satellites transit in their respective orbits, the beams they project onto the Earth move relative to users, periodically changing which satellites can provide service for particular users. This occurs for example as satellites come into or disappear from "view". The same effect also occurs between beams in a single satellite, with service for particular users changing as the beams move across the earth's surface. In addition, mobile users sometimes move relative to beams or satellite paths, also causing beam coverage or service areas to change. In these situations, communication links for signals must be handed off between beams. A similar process occurs for terrestrial cellular systems where users move relative to base stations and sectors or sector boundaries within cells.

A basic technique developed to prevent loss of signal and improved transfer of information is the so-called "soft" handoff scheme which is described in U.S. Pat. No. 5,101,501, referred to above. In this technique, a new link or signal path is established through a new satellite, or satellite beam, before the existing or old link is disconnected or discarded. The information (energy) available for a given communication signal from each path can be combined to provide improved signal reception, as well as prevent disconnected communication links. This can be done for either the forward link communications from gateway-to-user terminal, or the reverse link communications from user terminal-to-gateway. For the reverse link, the diversity combining process is accomplished at the gateway or within a centralized control or switching center.

Unfortunately, when using soft handoff techniques in satellite communication systems several problems arise. While diversity can be used to improve signal characteristics for communication links involving multiple satellites, it is not useful for communicating to a user through multiple beams on a single satellite. Beams from a single satellite have virtually the same path at the same frequency on a forward link, with nearly the same transit time, and have the same fading or interference characteristics. Diversity combining two such forward link signals provides little benefit, while unnecessarily consuming power and adding to the background noise level or interference.

Users can also traverse between adjacent beams quickly and move back and forth along their respective boundaries. If a user is moving along the Earth's surface perpendicular to the direction of sweep for a satellite spot containing a series of beams, the user might traverse between two adjacent beams repeatedly. In this situation, a user can switch between adjacent beams on a frequent basis, especially where the beams are near the edge of coverage for a satellite spot. In addition, other factors such as low satellite elevation and local terrain or signal blockage continuously impact signal quality. In this situation, the communication system may be continuously switching between beams in a soft handoff mode to maintain a best communication link.

A similar process may occur for mobile users moving around in sectored cells in terrestrial communication systems. That is, where the cells are subdivided into two or more smaller service areas which are covered at differing frequencies or using different code spaces. Here, mobile users may travel along or repeatedly cross sector boundaries within a cell, depending on such factors as cell and sector size and local physical environment. The resulting switching activity may be increased by the use of techniques meant to otherwise increase cell capacity. For example, a cell may employ a series of relatively small sectors or sectors having adjustable sizes to increase capacity or accommodate certain traffic patterns relative to the cell service area. However, smaller sectors and more sector boundaries increase the likelihood of more frequent handoffs between sectors. Changing sector sizes may also shift a user terminal back and forth between adjacent sectors with a minimum amount of physical movement.

This switching activity tends to consume excessive system resources in several ways. First, the time spent establishing links and selecting channels, with corresponding signal time, frequency, and phase tracking, error detection, and so forth, consumes signal processing resources which could be applied to other tasks such as signal demodulation, diversity combining, and decoding. Second, for a substantial period of time, multiple orthogonal channels in each beam are in use by a single user. That is, orthogonal codes in adjacent beams, or sectors, are allocated to a single user. Since there are a relatively limited number of such orthogonal channels available in the communication system, this decreases effective system capacity. Third, additional power is consumed maintaining each active channel for a single user, double for two channels, and energy deposited into such communication channels causes interference, which is deleterious to system operation.

Therefore, what is needed is a handoff technique which allows a soft handoff between adjacent beams from a single satellite with decreased system resources when the user is traversing between such beams. The technique should also address soft handoff between adjacent sectors within a cell serviced by a base station or cell-site. The method should provide a solution that decreases unnecessary consumption of system resources while remaining compatible with other soft handoff schemes.

SUMMARY OF THE INVENTION

In view of the above problems encountered in the art, one purpose of the present invention is to provide a technique for handing off or transferring communication links between adjacent service areas defined by beams of a single satellite or sectors in a cell, while minimizing utilization of system resources.

An advantage of the present invention is that soft handoff can be employed for reverse link signal transfer while being eliminated or used less frequently and/or for shorter durations on forward link transfers.

Another purpose of the invention is to reduce switching and communication signal tracking and control operations during transfers between adjacent service areas for single satellites and cells.

Another advantage of the invention is that system capacity can be increased by increasing the general availability of orthogonal channelizing codes and traffic channels.

Yet another advantage of the invention is that certain pilot signal adjustments can be accommodated more accurately, allowing increased system capacity.

These and other purposes, advantages, and objects of the present invention are realized in a method and apparatus for performing handoff between adjacent service areas in a wireless communication system that transfers communication signals using at least one central communications station which establishes geographical service areas for user terminals operating within the system. The central station is generally either a gateway that establishes adjacent service areas using satellite beams from a single satellite, or a single base station that establishes adjacent service areas as sectors of a cell.

A physical transition of a user terminal between two adjacent service areas, each established by a common central communications station, is detected by determining the signal strength for signals originating from the adjacent service areas. While the user terminal continues to use a forward link channel in a first service area, the use of a forward link channel in a second service area is set up. This action is taken when a detected signal strength for the second adjacent service area at least equals that of the first service area. Once the forward link traffic channel is established in the second service area, its satisfactory operation is confirmed according to a preselected minimum quality level, based on various known criteria, and the forward link for the first service area is disengaged or inactivated. Applicable criteria are based on known factors, such as on determining if the new channel has sufficient energy, or a sufficiently low error rate to maintain a desired level of communication service.

Preferably either pilot or paging signals associated with the service areas form the signals used for detecting service area transitions, and the strength of such signals determines a signal strength for each service area relative to the user terminal position. The pilot or paging signals are received using at least one user terminal receiver, and their strength is measured using known techniques and processing elements. The strength of signals from different service areas can then be compared, typically by at least temporarily storing one or more measurements for operation on by one or more comparators, control processors, or other known processing elements.

Preferably, signal strength measurement information is transmitted as part of one of several known types of signals to the central station, which receives the measurement information using known signal reception means and techniques. The central station then compares received signal strength values and determines relative signal strengths. The central station may use additional signal information available internally as part of this comparison or in determining signal strength.

The central station can then use a communications transmitter to transmit the results of this comparison to the user terminal. At the same time, the central station can set up a desired new channel through the new service area to be used, in accordance with known capacity limitations, or various channel assignment procedures and schemes. By periodically reporting pilot signal measurements to the central station, a need for new channels can be more readily anticipated, allowing some channels to even be reserved as desired.

Alternatively, the signal strength measurement information is used by the user terminal to detect and compare the signal levels for the two adjacent service areas. The user terminal determines that a transition between the service areas is occurring, or that the relative strength of a signal from a new service area exceeds that currently in use. The user terminal sends this information to the gateway or base station, instead of sending signal measurement information. The gateway again determines if a new traffic channel can be assigned, and assigns the new channel, as appropriate to implement the handoff.

In further aspects of the invention, the presence of adjusted pilot signals is detected. That is, a means is used to detect pilot signals being received that have had their power adjusted during transmission to boost signal strength and compensate for signal roll-off conditions near the edges of beams. When such adjusted pilot signals are detected, a so-called a compensation factor is derived for each one which has substantially the same magnitude as the boost or increase applied to the signal. This compensation factor is then applied as a negative adjustment or bias to the signal level during the strength measurements for each such adjusted pilot signal to compensate for the artificial boost in power and arrive at a more accurate non-adjusted strength determination. This compensation factor or value can be applied either at the user terminal or the central station, as desired.

In addition, the central station can synchronize the timing of communication signals and forward link channels for a user terminal through both old and new service areas. This can be done when either the gateway or the user terminal determines that a new forward link channel is desired for the user terminal in a new service area. By using appropriate signal timing and control elements in the central station, the signal timing can be synchronized so that the forward link of the first service area can be disengaged and the use of the forward link channel for said second service area commenced at substantially the same time.

It is very desirable to prevent undue switching between beams and a corresponding expenditure of system resources. Therefore, in further aspects of the invention, a form of hysteresis can be used in which the value for at least one pre-selected communication parameter is inspected on a periodic basis. Any request for a new forward link channel is either prevented from being generated or blocked from transfer until a minimum change in the monitored value has occurred, since a new forward link channel was previously requested. Exemplary parameters are time and signal energy level. The user terminal can determine when a pre-selected minimum period of time has passed since a new forward link channel was previously requested, or when a pre-selected minimum signal level has been reached by a current service area signal before requesting a forward link channel.

This can be implemented, for example, by storing signal identification information for each service area used, up to a predetermined maximum number, in a memory for a predetermined maximum length of time. Signal identification for any newly detected service area is then compared to stored identification information to determine if the same service area is being detected again, and within a restricted period of time. This information can be used by central stations, gateways or base stations, to limit the amount of inter-beam or inter-sector switching.

BRIEF DESCRIPTION OF THE DRAWINGS

The features, objects, and advantages of the present invention will become more apparent from the detailed descriptions set forth below when taken in conjunction with the drawings in which like reference characters identify correspondingly throughout and wherein:

FIG. 2a illustrates a perspective view of a signal beam pattern between one of the satellites of FIG. 1 and the surface of the Earth;

FIG. 2b illustrates a perspective view of a signal beam pattern between a base station of FIG. 1 and the surface of the Earth;

FIG. 6c illustrates an exemplary irregular path for a user terminal traversing adjacent sectors in a cell;

DETAILED DESCRIPTION OF THE PREFERRED EMBODIMENT

The present invention is a handoff technique in which system users detect transitions between service areas defined by satellite beams, or sectors in a cell, and request a forward link channel in a new service area when a detected signal strength for a signal servicing that area exceeds one or more predetermined threshold levels. Forward and reverse direction communication links in the current service area are maintained until the strength of a new service area signal reaches a certain level, and appropriate channel quality is confirmed, as based on various known factors. Typically, service area transitions are detected by receiving new pilot or paging signals associated with new service areas, and it is the strength of such signals that is used to determine a relative signal strength of the new beam or sector.

The present invention is particularly suited for use in communications systems employing either Earth orbiting satellites, or highly sectorized cells. However, it will be apparent to those skilled in the relevant art that the concept of the present invention can be applied to a variety of satellite systems even when not utilized for communications purposes. The present invention can also be applied to cells using a variety of cell sectorization schemes, again, even when not utilized for user communications.

The preferred embodiment of the invention is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the present invention. The present invention could find use in a variety of wireless information and communication systems, including those intended for position determination, and satellite and terrestrial cellular telephone systems. A preferred application is in CDMA wireless spread spectrum communication systems for mobile or portable telephone service.

Figure 1:
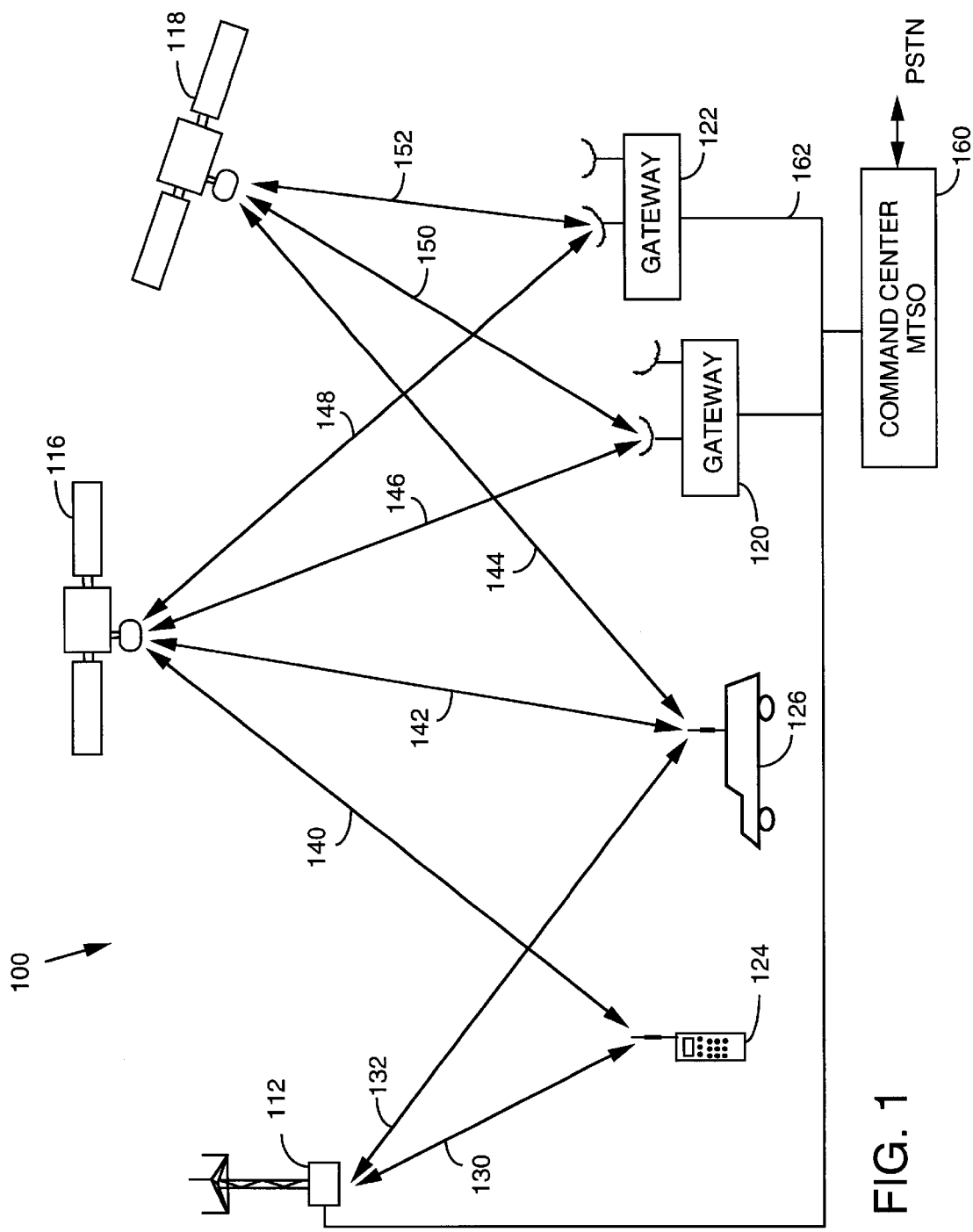
FIG. 1 illustrates an overview of a wireless spread spectrum communication system using satellites.

An exemplary wireless communication system in which the present invention is found useful, is illustrated in FIG. 1. It is contemplated that this communication system uses CDMA type communication signals, but this is not required by the present invention. In a portion of a communication system 100 illustrated in FIG. 1, one base station 112, two satellites 116 and 118, and two associated gateways or hubs 120 and 122 are shown for effecting communications with two remote user terminals 124 and 126. Typically, the base stations and satellites/gateways are components of separate communication systems, referred to as being terrestrial and satellite based, although, this is not necessary. The total number of base stations, gateways, or satellites in such systems depends on desired system capacity and other factors well understood in the art.

The terms base station and gateway are also sometimes used interchangeably, each being a fixed central communication station, as referenced above, with gateways being perceived in the art as highly specialized base stations that direct communications through satellite repeaters while base stations (also sometimes referred to as cell-sites) use terrestrial antennas to direct communications within surrounding geographical regions. Gateways have more 'housekeeping tasks,' with associated equipment, to maintain satellite communication links, and any central control centers also typically have more functions to perform when interacting with gateways and moving satellites. However, the present invention finds application in systems using either gateways or base stations as central fixed communication stations.

User terminals 124 and 126 each have or comprise a wireless communication device such as, but not limited to, a cellular telephone, a data transceiver, or a paging or position determination receiver, and can be hand-held or vehicle mounted as desired. However, while user terminals are generally viewed as being mobile, it is also understood that the teachings of the invention are applicable to "fixed" units in some configurations. User terminals are sometimes also referred to as subscriber units or simply as 'users' in some communication systems, depending on preference.

Generally, beams from base station 112 or satellites 116 and 118 cover different geographical areas in predefined patterns. Beams at different frequencies, also referred to as CDMA channels or 'sub-beams', can be directed to overlap the same region. It is also readily understood by those skilled in the art that beam coverage or service areas for multiple satellites, or antenna patterns for multiple base stations, might be designed to overlap completely or partially in a given region depending on the communication system design and the type of service being offered, and whether space diversity is being achieved.

While only two satellites are shown for clarity, a variety of multi-satellite communication systems have been proposed with an exemplary system employing on the order of 48 or more satellites, traveling in eight different orbital planes in Low Earth Orbit (LEO) for servicing a large number of user terminals. However, those skilled in the art will readily understand how the teachings of the present invention are applicable to a variety of satellite system and gateway configurations. This includes other orbital distances and constellations, for example, those using geostationary satellites where beam-switching results mostly from user terminal motion. In addition, a variety of base station configurations can also be used.

In FIG. 1, some possible signal paths are illustrated for communications being established between user terminals 124 and 126 and base station 112, or through satellites 116 and 118, with gateways 120 and 122. The base station-user terminal communication links are illustrated by lines 130 and 132. The satellite-user terminal communication links between satellites 116 and 118, and user terminals 124 and 126 are illustrated by lines 140, 142, and 144. The gateway-satellite communication links, between gateways 120 and 122 and satellites 116 and 118, are illustrated by lines 146, 148, 150, and 152. Gateways 120 and 122, and base station 112, may be used as part of one or two-way communication systems or simply to transfer messages or date to user terminals 124 and 126.

Communication system 100 generally includes one or more system wide controllers or switching networks 160. Exemplary elements used in such controllers are mobile telephone switching offices (MTSO), which include interface and processing circuitry for controlling routing of telephone calls between a public switched telephone network (PSTN) and gateways. Other exemplary equipment includes ground operations control and command centers which provide system-wide control over timing, PN and orthogonal code and frequency assignments, system access, and so forth, for gateways and satellites. A communication link 162 coupling controllers 160 to various gateways or base stations can be established using known techniques such as, but not limited to, dedicated telephone lines, optical fiber links, or microwave or dedicated satellite communication links.

As shown in FIG. 2a, satellites in such a communication system (100), including satellites 116 and 118, project beams in "spots" or "footprints" 210 that move over the Earth's surface in accordance with satellite orbital motion. The satellite footprint consists of one spot 210 formed by a series of separate beams 212, or sub-beams, projected in a generally circular pattern. Here, spot 210 is formed with one central beam in the middle surrounded by a series of beams 212. However, a variety of patterns, beams and beam sizes can be used, as would be known to one skilled in the art. As discussed further below, a user may move from a position X in one beam 212 to a position Y in a neighboring beam 212 along a path illustrated by line 214. This can occur as a result of either user terminal or beam movement or a combination of both.

Typically, communication system 100 subscribers or users may utilize signal paths through satellites 116 and 118 when they are elevated anywhere from 10 degrees or more above a horizon measured relative to the user terminal seeking communication service. The angle at which useful communication occurs is, however, dependent upon whether or not there are obstructive or attenuating objects in the path, and known system requirements or desires for minimum error rates and interference.

As shown in FIG. 2b, base stations or cell cites in such a communication system (100), including base station 112, project beams or signals within a cell 220 covering a predetermined service area on the Earth's surface in accordance with signal strength and local terrain. Cell 220 consists of one overall coverage area formed by a series of separate beams or signals that create sectors 222, projected in a generally wedge shaped patterns. Here, cell 220 is formed using a series of six sectors 222, not all having the same area or size. However, a variety of patterns, sectors, and sector sizes can be used, as would be known to one skilled in the art. As discussed further below, a user may move from a position X in one sector 222 to a position Y in a neighboring sector 222 along a path illustrated by line 224. This occurs as a result of either user terminal movement or changing sector coverage or a combination of both.

Figure 3A:
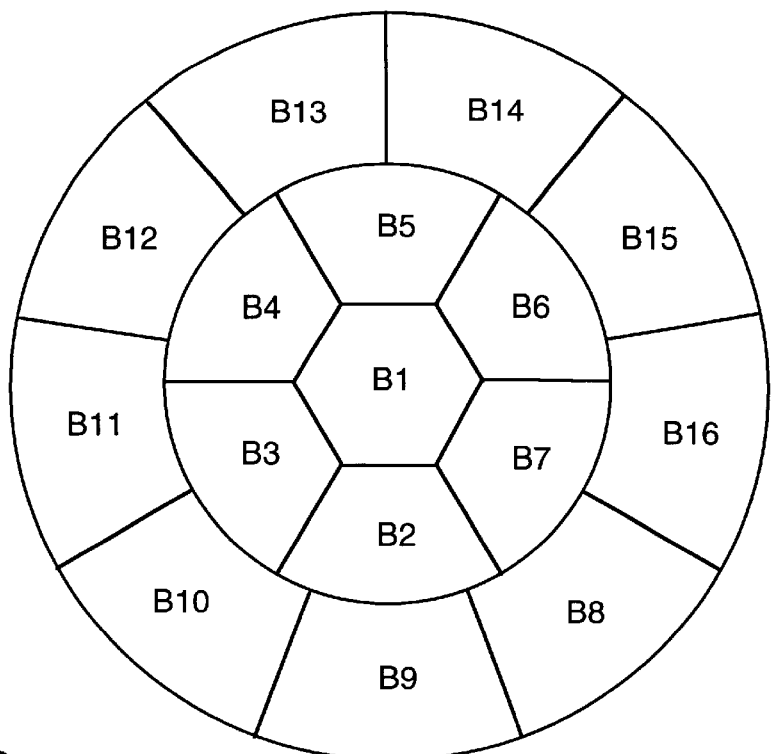
FIG. 3a illustrates a theoretical satellite communication signal footprint with corresponding beam patterns for one of the satellites in FIG. 1.
Figure 3B:
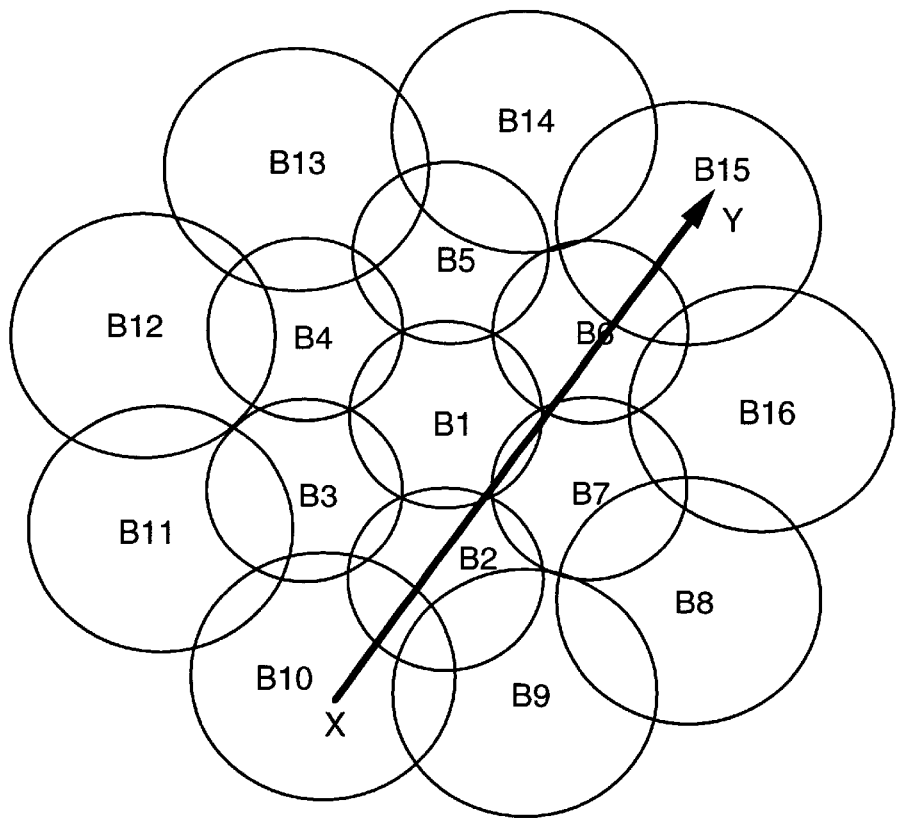
FIG. 3b illustrates an exemplary signal footprint and beam patterns for one of the satellites in FIG. 1 with typical beam size variations and overlap.
Figure 3C:
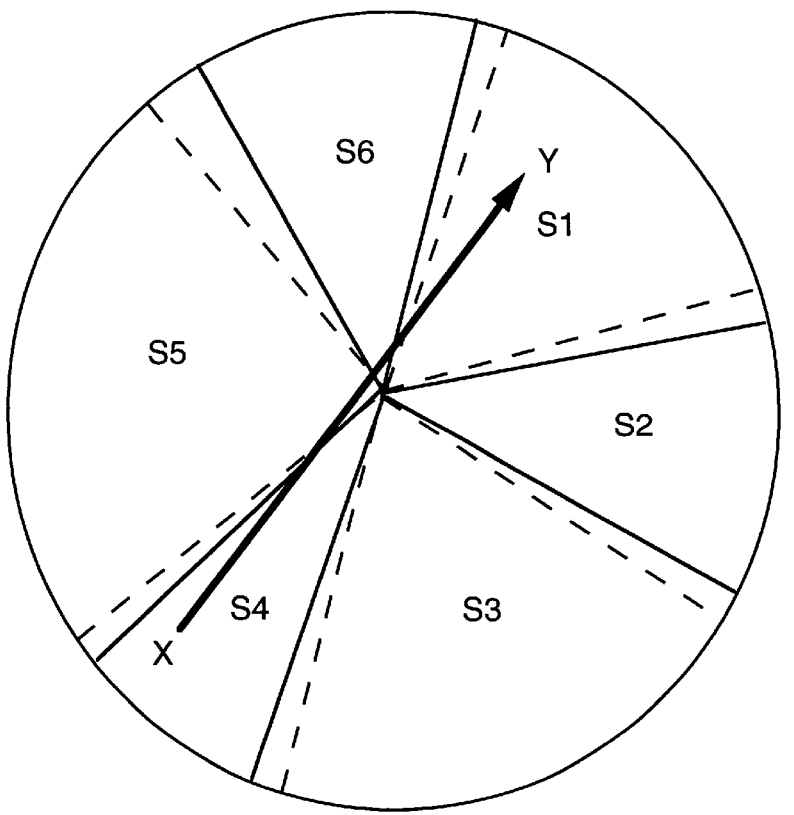
FIG. 3c illustrates an exemplary signal pattern for a base station in FIG. 1 with typical theoretical sector boundaries and variations.

Exemplary beam and sector patterns are illustrated in further detail in FIGS. 3a, 3b, and 3c. FIGS. 3a and 3b illustrate satellite communication system signals projected onto the surface of the Earth, while FIG. 3c illustrates a coverage pattern for a generally circular sectorized cell. However, other patterns of elongated or irregular shape can be employed within the teachings of the invention, as desired.

In FIG. 3a, a series of beams B1–B16 are shown in a generally circular pattern or spot 210. Spot 210 is formed with one central beam B1 in the middle surrounded by six beams B2–B7, and then nine additional beams B8–B16. This is an 'ideal' pattern which is illustrated as having precisely straight edges and non-overlapping regions of coverage between adjacent beams. The adjacent beams in this example operate in the same frequency band and multiple sub-beams form the same pattern with corresponding regions of coverage overlaid on this pattern, each operating at different frequencies. Those skilled in the art are familiar with this type of pattern and the frequency and PN code assignments used to form such patterns.

As would be readily apparent to those skilled in the art, actual beams are more circular or elliptical in shape, and form more elongated or irregularly shaped patterns as they are projected by satellite transponders or antenna systems. The beams or sub-beams also create overlapping regions of coverage, with beam energies generally being tailored at transmission, to decrease somewhat rapidly near the edges or boundaries, to decrease overlapping signal coverage. A resulting type of pattern more closely representative of these effects is illustrated in FIG. 3b, where each of the beams is shown as a more circular spot with adjacent beams having regions of slight overlap.

In FIG. 3c, a series of sectors S1–S6 are shown in a generally circular pattern or cell 220. This cell is illustrated as having irregular edges as a result of how the signals are projected by transponders or antenna systems and the impact of local terrain or structures, as known in the art. As illustrated, the sectors need not be uniform in size, and may even have their respective coverage areas adjusted during operation of the communication system. The sector beams or signals also create overlapping sector boundaries or regions of coverage between adjacent sectors, with beam energies generally being tailored at transmission, to decrease more rapidly near the edges or boundaries, to decrease overlapping signal coverage. The overlapping boundaries are shown using solid and dashed lines for adjacent sector boundaries. The adjacent sectors in this example each use different PN codes or code offsets in a manner similar to the satellite sub-beams. Those skilled in the art are familiar with these types of patterns and the frequency and PN code assignments used to form such patterns.

Figure 4:
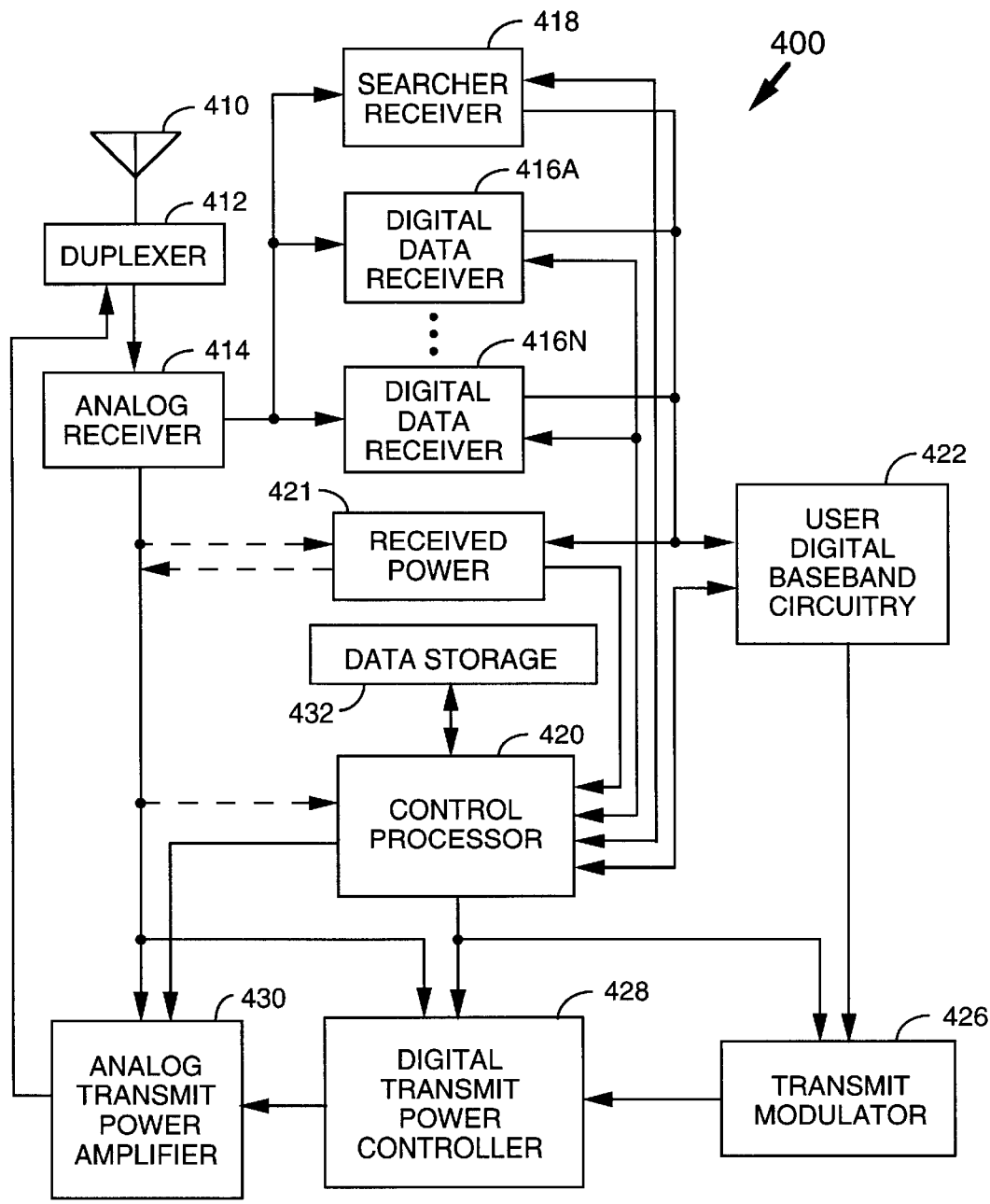
FIG. 4 illustrates user terminal apparatus operating according to the present invention within the system of FIG. 1.

An exemplary transceiver 400 for use in a user terminal 126 to acquire signals or channels in beams B1–B16 is illustrated in FIG. 4. Such transceivers are known in the art and discussed in the patents referenced above, such as U.S. Pat. No. 5,109,390.

Transceiver 400 uses at least one antenna 410 for receiving communication signals which are transferred to an analog receiver 414, where they are downconverted, amplified, and digitized. A duplexer element 412 is typically used to allow the same antenna to serve both transmit and receive functions. However, some systems employ separate antennas for operating at different transmit and receive frequency bands.

The digital communication signals output by analog receiver 414 are transferred to at least one digital data receiver 416A and preferably at least one digital searcher receiver 418. Additional digital data receivers 416B–416N can be used to obtain desired levels of signal diversity or receive multiple signals, depending on the acceptable level of unit complexity, as would be apparent to one skilled in the relevant art. Additional searcher receivers can also be used for implementing more complex signal acquisition or searching techniques.

At least one user terminal control processor 420 is coupled to data receivers 416A–416N and searcher receiver 418. Control processor 420 provides, among other functions, basic signal processing, timing, power and handoff control or coordination, and selection of frequency used for signal carriers. Another basic control function often performed by control processor 420 is the selection or manipulation of PN code sequences or orthogonal functions to be used for processing communication signal waveforms. Control processor 420 signal processing can include a determination of relative signal strength and computation of various related signal parameters. Such computations of signal parameters, such as timing and frequency may include the use of additional or separate dedicated circuitry to provide increased efficiency or speed in measurements or improved allocation of control processing resources. For example, in FIG. 4 a signal strength measuring element 421 is shown for using certain information available in the analog receiver to determine the signal strength or power for the overall received analog signal. Measuring element 421 is also shown using outputs of, or data available from, the digital data and searcher receivers for measuring the energy or power in specific signals being received or demodulated.

Outputs for data receivers 416A–416N are coupled to remaining digital baseband circuitry 422 within the user terminal. User digital baseband circuitry 422 comprises processing and presentation elements used to transfer information to and from a user terminal user. That is, signal or data storage elements, such as transient or long term digital memory; input and output devices such as display screens, speakers, keypad terminals, and handsets; A/D elements, vocoders and other voice and analog signal processing elements; etc., all form parts of the subscriber baseband circuitry using elements well known in the art. If diversity signal processing is employed, user digital baseband circuitry 422 can comprise a diversity combiner and decoder. Some of these elements may also operate under the control of, or in communication with, control processor 420.

When voice or other data is prepared as an output message or communications signal originating with the user terminal, user digital baseband circuitry 422 is used to receive, store, process, and otherwise prepare the desired data for transmission. User digital baseband circuitry 422 provides this data to a transmit modulator 426 operating under the control of control processor 420. The output of transmit modulator 426 is transferred to a power controller 428 which provides output power control to a transmit power amplifier 430 for final transmission of the output signal from antenna 410 to a gateway or base station.

Information or data corresponding to one or more measured signal parameters for received communication signals, or one or more shared resource signals, can be sent to the gateway using a variety of techniques known in the art. For example, the information can be transferred as a separate information signal or be appended to other messages prepared by user digital baseband circuitry 422. Alternatively, the information can be inserted as predetermined control bits by transmit modulator 426 or transmit power controller 428 under control of control processor 420, using known "puncturing" or multiplexing techniques.

Data receivers 416A–N and searcher receiver 418 are configured with signal correlation elements to demodulate and track specific signals. Searcher receiver 418 is used to search for pilot signals, or other relatively fixed pattern strong signals, while data receivers 416A–N are used to demodulate other signals associated with detected pilot signals. For purposes of determining signal strength, however, a data receiver 416 can be assigned to track the pilot signal after acquisition to accurately determine the ratio of signal chip energies to signal noise. The pilot signal chip energies are integrated over predetermined intervals, such as symbol periods, to formulate pilot signal strength. Therefore, the outputs of these units can be monitored to determine the energy in or frequency of the pilot signal or other signals. These receivers also employ frequency tracking elements that can be monitored to provide current frequency and timing information, to control processor 420 for signals being demodulated.

Figure 5:
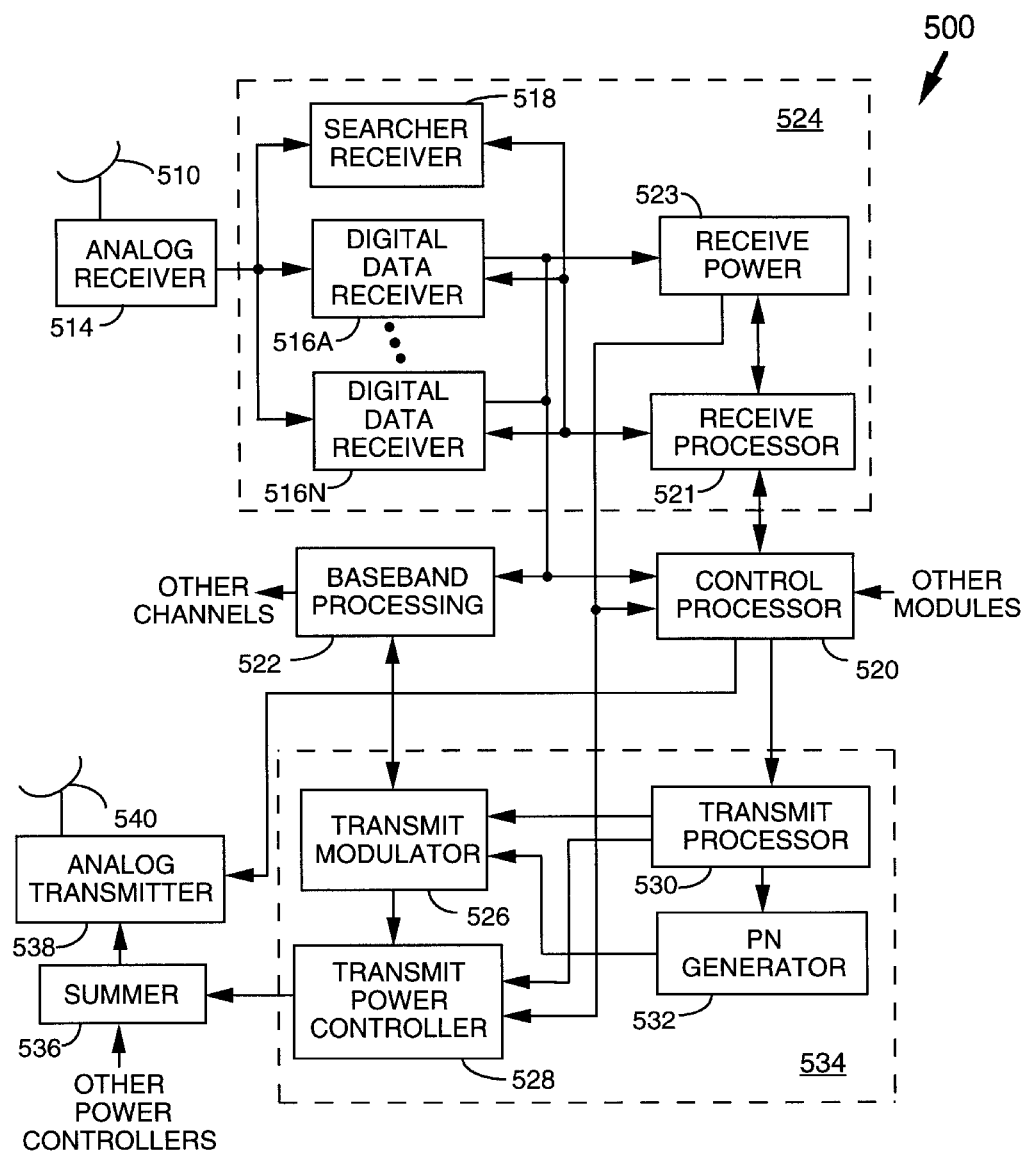
FIG. 5 illustrates typical gateway apparatus operating according to the present invention within the system of FIG. 1.

An exemplary transmission and reception apparatus 500 for use in a gateways 120 and 122 is illustrated in FIG. 5. Such apparatus is known in the art and discussed in the patents referenced above. For example, additional details on the operation of this type of apparatus are found in U.S. Pat. No. 5,103,459, issued Apr. 7, 1992, entitled "System And Method For Generating Signal Waveforms In A CDMA Cellular Telephone," assigned to the same assignee as the present invention and incorporated herein by reference.

The portion of gateway 120, 122 illustrated in FIG. 5 has one or more analog receivers 514 connected to an antenna 510 for receiving communication signals which are then downconverted, amplified, and digitized using various schemes well known in the art. Multiple antennas 510 are used in some communication systems. Digitized signals output by analog receiver 514 are provided as inputs to at least one digital receiver module, indicated by dashed lines generally at 524.

Each digital receiver module 524 corresponds to signal processing elements used to manage communications between one user terminal 124, 126 and a base station 112 or a gateway 120, 122, although certain variations are known in the art. One analog receiver 514 can provide inputs for many digital receiver modules 524, and a number of such modules are typically used in gateways 120, 122 to accommodate all of the satellite beams and possible diversity mode signals being handled at any given time. Each digital receiver module 524 has one or more digital data receivers 516 and preferably at least one digital searcher receiver 518. Searcher receiver 518 generally searches for appropriate diversity modes of signals other than pilot signals. Where implemented in the communication system, multiple data receivers 516A–516N are used for diversity signal reception.

The outputs of digital data receivers 516 are provided to subsequent baseband processing elements 522 comprising apparatus well known in the art and not illustrated in further detail here. Exemplary baseband apparatus includes diversity combiners and decoders to combine multipath signals into one output for each subscriber. Exemplary baseband apparatus also includes interface circuits for providing output data, typically to a digital switch or network. A variety of other known elements such as, but not limited to, vocoders, data modems, and digital data switching and storage components may form a part of baseband processing elements 522. These elements operate to control or direct the transfer of data signals to one or more transmit modules 534.

Signals to be transmitted to user terminals are each coupled to one or more appropriate transmit modules 534. A typical gateway uses a number of such transmit modules 534 to provide service to many user terminals 124, 126 at a time, and for several satellites and beams at a time. A base station may also use a number of such modules, although base stations tend to group transmit and receive functions more closely together in modem structures. The number of transmission modules 534 used by gateway 120, 122 is determined by factors well known in the art, including system complexity, number of satellites in view, subscriber capacity, degree of diversity chosen, and the like.

Each transmit module 534 includes a transmit modulator 526 which spread-spectrum modulates data for transmission.

Transmit modulator 526 has an output coupled to a digital transmit power controller 528, which controls the transmission power used for the outgoing digital signal. Digital transmit power controller 528 applies a minimum level of power for purposes of interference reduction and resource allocation, but applies appropriate levels of power when needed to compensate for attenuation in the transmission path and other path transfer characteristics. A PN generator 532 is used by transmit modulator 526 in spreading the signals. This code generation can also form a functional part of one or more control processors or storage elements used in gateway 122, 124, or base station 112.

The output of transmit power controller 528 is transferred to a summer 536 where it is summed with the outputs from other modulators or transmit power control circuits. Those outputs are signals for transmission to other user terminals 124, 126 at the same frequency and within the same beam as the output of transmit power controller 528. The output of summer 536 is provided to an analog transmitter 538 for digital-to-analog conversion, up-conversion to the appropriate RF carrier frequency, further amplification and output to one or more antennas 540 for radiating to user terminals 124, 126. Antennas 510 and 540 may be the same antennas depending on the complexity and configuration of the system.

At least one gateway control processor 520 is coupled to receiver modules 524, transmit modules 534, and baseband circuitry 522; these units may be physically separated from each other. Control processor 520 provides command and control signals to effect functions such as, but not limited to, signal processing, timing signal generation, power control, handoff control, diversity combining, and system interfacing. In addition, control processor 520 assigns PN spreading codes, orthogonal code sequences, and specific transmitters and receivers for use in subscriber communications.

Control processor 520 also controls the generation and power of pilot, synchronization, and paging channel signals and their coupling to transmit power controller 528. The pilot channel is simply a signal that is not modulated by data, and may use a repetitive unchanging pattern or non-varying frame structure type input (pattern) into transmit modulator 526. That is, the orthogonal function, Walsh code, used to form the channel for the pilot signal generally has a constant value, such as all 1's or 0's, or a well known repetitive pattern, such as a structured pattern of interspersed 1's and 0's. This effectively results in transmitting only the PN spreading codes applied from PN generator 532. In addition, a pilot signal is non-power controlled. That is, the pilot signal is transmitted at a preselected fixed power level, which is not varied so that accurate measurements of signal power are achieved by user terminals.

While control processor 520 can be coupled directly to the elements of a module, such as transmit module 524 or receive module 534, each module generally comprises a module-specific processor, such as transmit processor 530 or receive processor 521, which controls the elements of that module. Thus, in a preferred embodiment, control processor 520 is coupled to transmit processor 530 and receive processor 521, as shown in FIG. 5. In this manner a single control processor 520 can control the operations of a large number of modules and resources more efficiently. Transmit processor 530 controls generation of, and signal power for, pilot, synchronization, paging signals, and traffic channel signals, and their respective coupling to power controller 528. Receiver processor 521 controls searching, PN spreading codes for demodulation and monitoring received power.

For certain operations, such as shared resource power control, gateways 120 and 122 receive information such as received signal strength, frequency measurements, or other received signal parameters from user terminals in communication signals. This information can be derived from the demodulated outputs of data receivers 516 by receive processors 521 or receive power measuring elements 523. Alternatively, this information can be detected as occurring at predefined locations in the signals being monitored by control processor 520, or receive processors 521, and transferred to control processor 520. Control processor 520 uses this information (as described below) to control the timing and frequency of signals being processed as well as the assignment of digital receivers for user signals.

Returning now to FIG. 2a, if a user terminal or subscriber unit residing initially in a region serviced or covered by beam B10, traverses to a region serviced by beam B15, because of either satellite or terminal motion, any active or established communication link needs to be handed off between the two beams to avoid disruption of communications. Actually, in this situation, there are several handoffs that take place between any two adjacent beams at a time, as several beams (B10, B2, B1/B7, B6) are traversed in succession. This is shown in more detail in FIGS. 6a and 6b, where only a few beams are shown adjacent to or along the perceived path for user terminal 122.

Figure 6A:
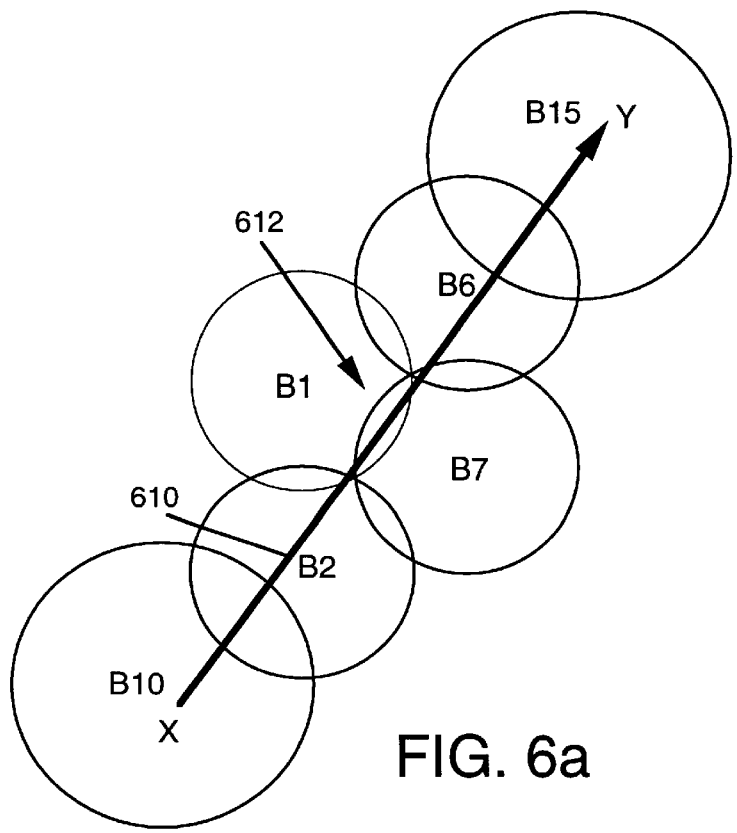
FIG. 6a illustrates an exemplary straight path for a user terminal traversing adjacent beams.
Figure 6B:
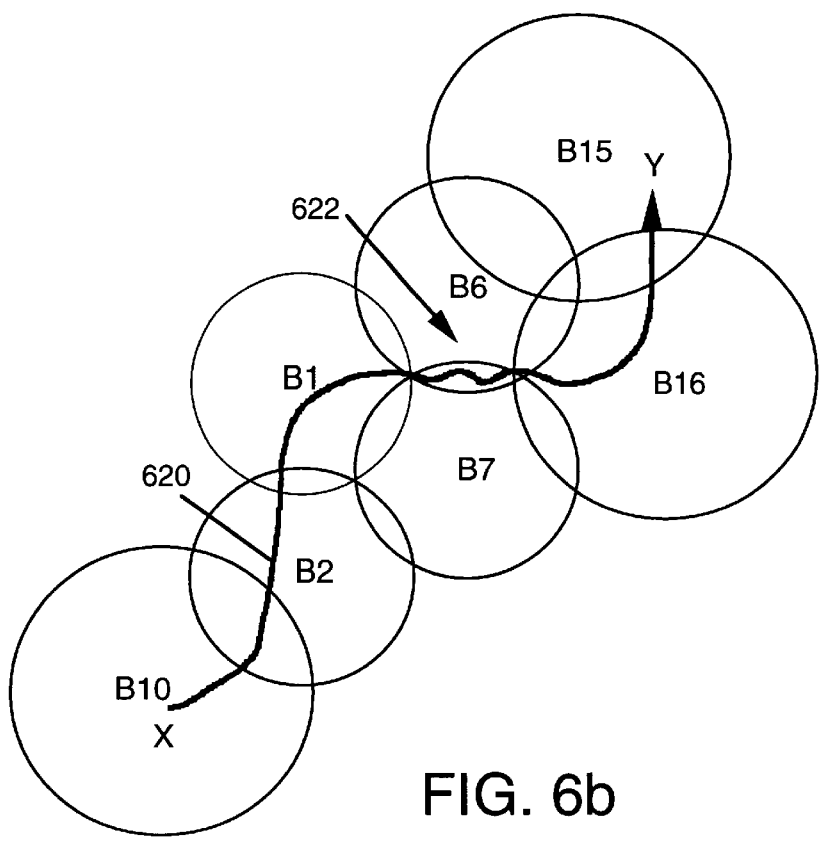
FIG. 6b illustrates an exemplary irregular path for a user terminal traversing adjacent beams.

In FIG. 6a, user terminal 122 travels along a straight path 610 from point X to point Y. In FIG. 6b, a variable path 620 followed by user terminal 122 is more irregular, moving from point X to point Y, traversing an additional beam B16. The path will depend on a variety of known factors such as speed and direction of movement of the user terminal along the surface of the Earth relative to the satellite, if moving, as well as the orbit of the satellite. This is a perceived path or projected change of location for the user terminal relative to the beam pattern. If the user terminal is at rest on the Earth, a generally straight path results as the beams sweep by the user terminal, except as altered by localized satellite movements. For example, it is well known that satellite orientation may be changed from time to time, such as by adjusting yaw, to account for seasonal changes in Earth and Sun positions or alignments. User terminal motion increases or decreases the rate of change along the path for movement parallel to the satellite orbit direction, and creates irregularities when directed at angles to the orbital plane. Regardless of the shape of the path, the general principles of the invention and its application are the same.

As shown in FIG. 6a, user terminal 122 crosses between two beams, initially B10 and B2. In the vicinity of the beam crossover, a transition region is entered in which two adjacent beams are present in the location of the user terminal. That is, in this region, a user terminal can detect the presence of the pilot signals for both beams. In a traditional cellular handoff scheme, the user terminal uses a searcher receiver to acquire the new pilot signal as it is encountered and a digital receiver is assigned to demodulate signals associated with that pilot, so that a 'soft handoff' type communication link can be established. After, the new link is established, the user terminal waits until it moves out of the beam coverage for the previous pilot signal (B10) and then drops the link related to that pilot signal.

Unfortunately, as discussed above, unlike typical multipath reception, there is no benefit in receiving signals using two of these beams on the forward link. In typical diversity signal reception, the signals to be combined are received over markedly different signal paths, either from different satellites or reflections from surfaces, and so forth. In that situation, the propagation paths are different enough in terms of time, attenuation, and other path effects, to allow gain from combining. However, for single satellite transfer of multiple beams of signals, the signals are transferred over virtually identical signal paths and the transit time is very nearly the same. Therefore, from a timing and phase point of view, little is to be gained, for diversity combining these signals.

In fact, diversity reception of two beams for forward link communication between a satellite and a user terminal can degrade system performance in several ways. This process involves excessive use of available resources. First, power is required in each beam for the satellite to transfer signals to the user terminal. Second, for systems utilizing orthogonal codes, at least one code is used in each beam for the user terminal. However, where there is no gain in signal processing, this represents lost power for the satellite and loss of use of a code. This translates to a decrease in system capacity, and unnecessary potential signal interference.

A corresponding illustration is provided in FIG. 6c for cell 220. Here, a variable or irregular path 630 is followed by user terminal 122 in moving from point X to point Y, traversing sectors S3, S4, S5, S6, and S1. The path depends on a variety of known factors such as speed and direction of movement of the user terminal, as well as any changes in sector boundaries. In FIG. 6c, the overlapping boundaries are again shown using solid and dashed lines. Regardless of the shape of the- path, the general principles of the invention and its application are the same. As in the case of multiple satellite beams, there is generally little if any benefit in receiving signals using two of these sectors on the forward link, except in certain circumstances.

The present invention takes advantage of some of the properties of sectors, satellite beams, and communication links and their control, to improve the handoff scheme for beam-to-beam or sector-to-sector transitions. The present invention decreases the power and code resources required for each user terminal undergoing such transitions, while maintaining 'soft' communication links. A flow chart representing of the steps used to implement handoff processing according to one embodiment of the present invention is illustrated in FIG. 7.

It is readily understood that due to the shape of the beams, there is a power or energy distribution across the beams that places lower power near a beam edge. Generally, this means that one or the other of the two beam signals is largest. Therefore, the transition from one beam to the next results in a gradual or rapid (depending on transition speed) build up in received power for one beam and a corresponding decrease in power from the other. That is, an increase or decrease in signal strength for received pilot signals is detected during a transition between the two adjacent beams. Where two or more beams intersect or overlap completely, the power of the beams may also be balanced substantially the same. The same effect is observed for adjacent sectors in a cell.

Figure 7:
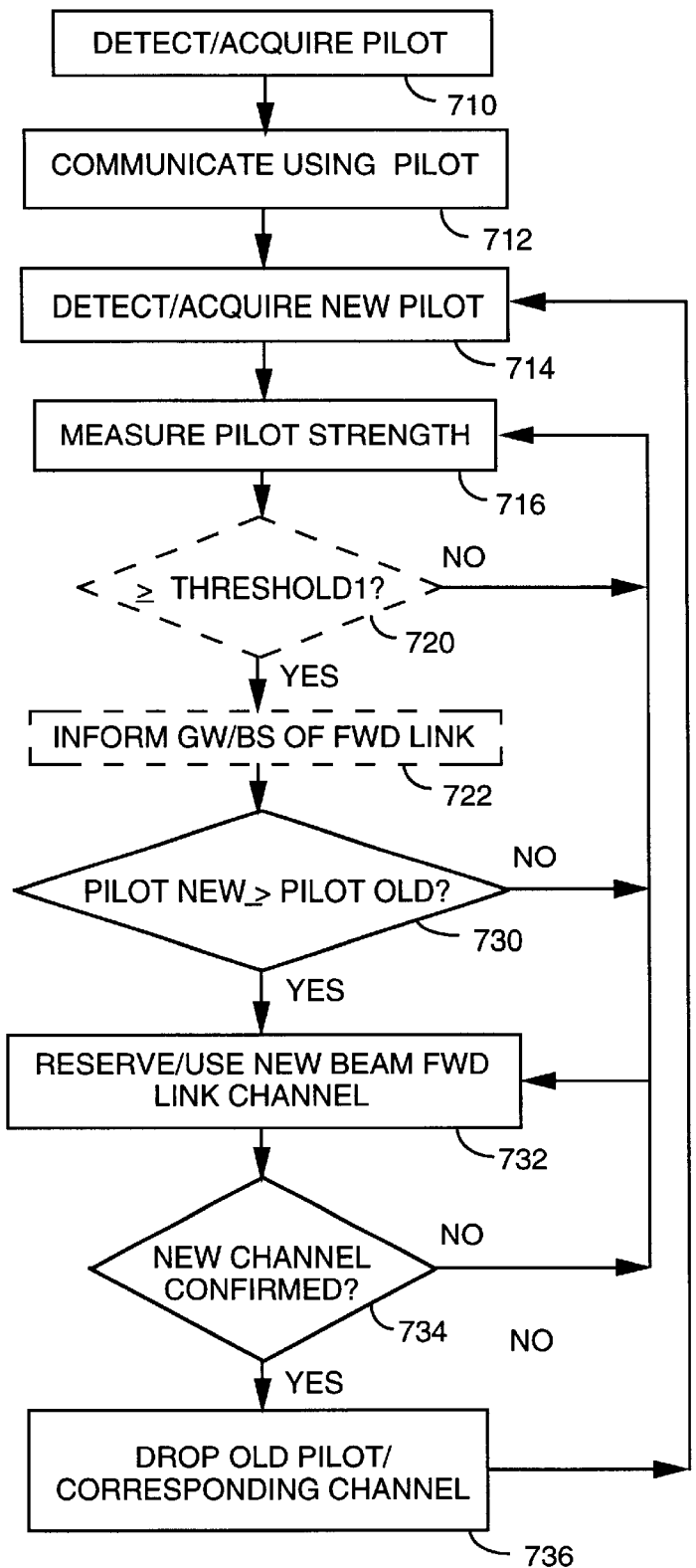
FIG. 7 illustrates steps used in the handoff process of the present invention for user terminals.

As seen in a step 710 of FIG. 7, a user terminal detects and acquires a pilot signal at some point in time, and uses this signal to establish a forward communication link. This could occur when the user terminal first commences communication, such as when starting at point X in beam B10, in FIG. 6a, or sector S4 in FIG. 6c. If several pilot signals are detected by a user terminal, generally the strongest signal is chosen for further processing. However, those skilled in the art will readily understand that other basis for selecting a pilot signal can be used as desired within the communication system, when first establishing a communication link. For, example some pilot signals could represent or originate from gateways which a particular user terminal is not allowed to communicate with for various technical or procedural reasons.

As discussed above, the use of pilot signals represents one preferred mode of operation for the invention, and other strong shared resource signals such as paging signals may also be used as desired.

The first acquired pilot signal is used, in a step 712, as a timing and phase reference to acquire and demodulate forward link communication signals associated with that pilot, or the base station or gateway transmitting that pilot. However, as the user terminal or the satellite moves, or as cell or beam boundaries are adjusted, at least one new pilot signal is detected in a step 714, as the user terminal approaches a beam or sector boundary or edge. A user terminal searcher receiver generally acquires this new pilot signal (step 714) and its relative signal strength is determined in a step 716, as compared to that of the previously selected pilot signal (step 710). The strength of the new pilot will either grow larger and larger as the user terminal crosses further into the new beam, or it will decrease as the path changes to enter another beam or move farther interior of the original beam.

As long as the signal strength of a newly detected pilot signal is less than that of the previous or already in use pilot signal at this point, the new pilot is not used to establish a new communication link or to set up a channel in the new beam. However, the new pilot signal strength can be compared to a predetermined threshold power level in an optional step 720. When the new pilot signal reaches this power level, which is still less than that of the previously chosen or in use pilot, the user terminal informs the communication system, or a particular gateway or base station in a step 722. The user terminal can simply report the signal strength measurement or that it exceeds the threshold, and allow the gateway to decide when a beam or sector transition is occurring. Alternatively, the user terminal makes a determination and reports that a transition appears to be approaching and requests a new channel, depending on user terminal or system complexity.

There is no requirement for reserving a forward link channel on the beam although this may be preferred where system capacity is substantially occupied and a channel will be needed to prevent call termination. This type of action can be used for 'priority' users where desired to maintain links. Channel reservation generally means that an orthogonal code is reserved for use by that user terminal, or at least assigned a priority for its use.

This first threshold power level is generally established at a few dB less than the strength of the current in use pilot, to minimize signal processing for brief excursions into the edge of a new beam coverage region. Those skilled in the art will readily understand how to select a threshold value based on the desired amount of beam transition to ignore, and availability of resources in the communication system. This threshold can be a static value or dynamically changeable. The value can be updated as part of the initial system communication with the user terminal, or on a periodic basis, and stored in a memory element for future use by a user terminal controller.

At some later time, the user terminal determines that the strength of the new pilot signal is at least equal to that of the previous pilot signal, in a step 730. At this point, the user terminal transmits this information or a channel request to the gateway or base station so that a new forward link communications channel is set up for the user terminal.

Alternatively, an already reserved channel (from step 722) is now used. This request may be processed by or through the central switching station or a ground operations control type facility as previously discussed above. In addition, the setup of forward link channels need not occur at an exact equality in signal strength, and a lower "threshold" type value for the new pilot signal strength can be chosen as desired. Again, depending on allocation of system resources. Those skilled in the art of designing communication systems are familiar with the criteria used for selecting this threshold level.

At this point, the new channel in the new beam is selected for use in a step 732, and the user terminal communicates both over a channel associated with the older pilot and beam, and over a channel associated with the new pilot and beam. This is similar to more conventional soft handoff signal processing on the forward link. The communication system, through the gateway or base station, is informed of the use of these two communication links or paths by the user terminal.

However, as soon as the gateway receives confirmation, in a step 734, from the user terminal that the forward traffic signal is being received satisfactorily from the new beam (channel), the previous beam (channel) signal is taken down, inactivated or dropped, in a step 736. That is, the first beam is no longer used for communication on the forward link with the user terminal. However, in some embodiments the previous forward link channel may still be reserved for use for some period of time, in case the user terminal needs to switch back. This process results in what can be termed a "quick", "fast", or "high-speed" soft handoff.

The return link signal in any beam is held as long as it proves useful in processing signals. When the return link reception in any beam or sector is too weak, attenuated, or significantly blocked to provide a useful signal path, it is dropped by the gateway or base station. The return and forward links may be established through separate beam or sector: configurations that differ significantly in coverage area or shape. Therefore, so the use of new and termination of old channels or beams for these two link directions occur independently of each other and may differ substantially.

Generally, confirmation step 734 involves determining certain well known attributes or criteria of the communication signals being received. For example, determining if the signals have sufficient energy, low enough error rates, and so forth, to support a desired level of communications. This determination can occur in a very short time span. As an example, confirmation can be accomplished using known signal parameter examination techniques in the user terminal, or by using preselected test data or patterns in signals transmitted to the user terminal which are retransmitted to the central station for receipt and analysis.

In typical satellite communication systems and under normal conditions, confirmation occurs after a few frames of data have been transferred to the user terminal. With a typical data frame in such systems being on the order of 20 ms in length, the total time two beams are in use is on the order of 20–80 ms for measuring signal quality, plus some additional time to account for signal delay through the satellite (around 10 ms or more). Little or no delay is generally involved for sectored cellular systems.

There are several approaches to determining and utilizing the pilot signal strength measurements. The user terminal can try to determine the strength of each pilot and compare them by either measuring each separately in a "direct" or absolute power sense, or "indirectly" by trying to measure a relative difference upon receipt.

For example, as previously shown in FIG. 4, the amount of energy in a pilot signal can be determined from information or measurements available in searcher 418 and receivers 416A–N, using measuring element 421 and control processor 420. The same measurement can be taken for two beams, sectors, or pilots and stored in data storage element 432 between comparison operations, as desired. Searcher receiver 418, is generally time shared, or switched between pilots signals, or additional receivers are used (416 or 418) for the strength measurements.

Unfortunately, various path, frequency, and transmission factors which may be known by the gateway, or base station, can effect the incident pilot power from beam-to-beam in a manner that makes measuring individual pilot signals inaccurate. In addition, computing or otherwise determining relative signal strengths, and monitoring changes or trends in pilot signal power can consume more resources than are sometimes desirable to provide in a user terminal.

One solution to these problems is to have the gateway or base station determine the relative and absolute pilot signal strengths from information provided by the user terminals. This is a preferred approach because the decision can be handled very efficiently by the gateway, or base station, communicating with the user terminal. In this approach, the user terminal simply reports the level of signal strength being received or a relative value, and changes being experienced. The user terminal can also report when signals are above a certain predetermined threshold. This process is shown in FIG. 8, where the first threshold test has been omitted.

Figure 8:
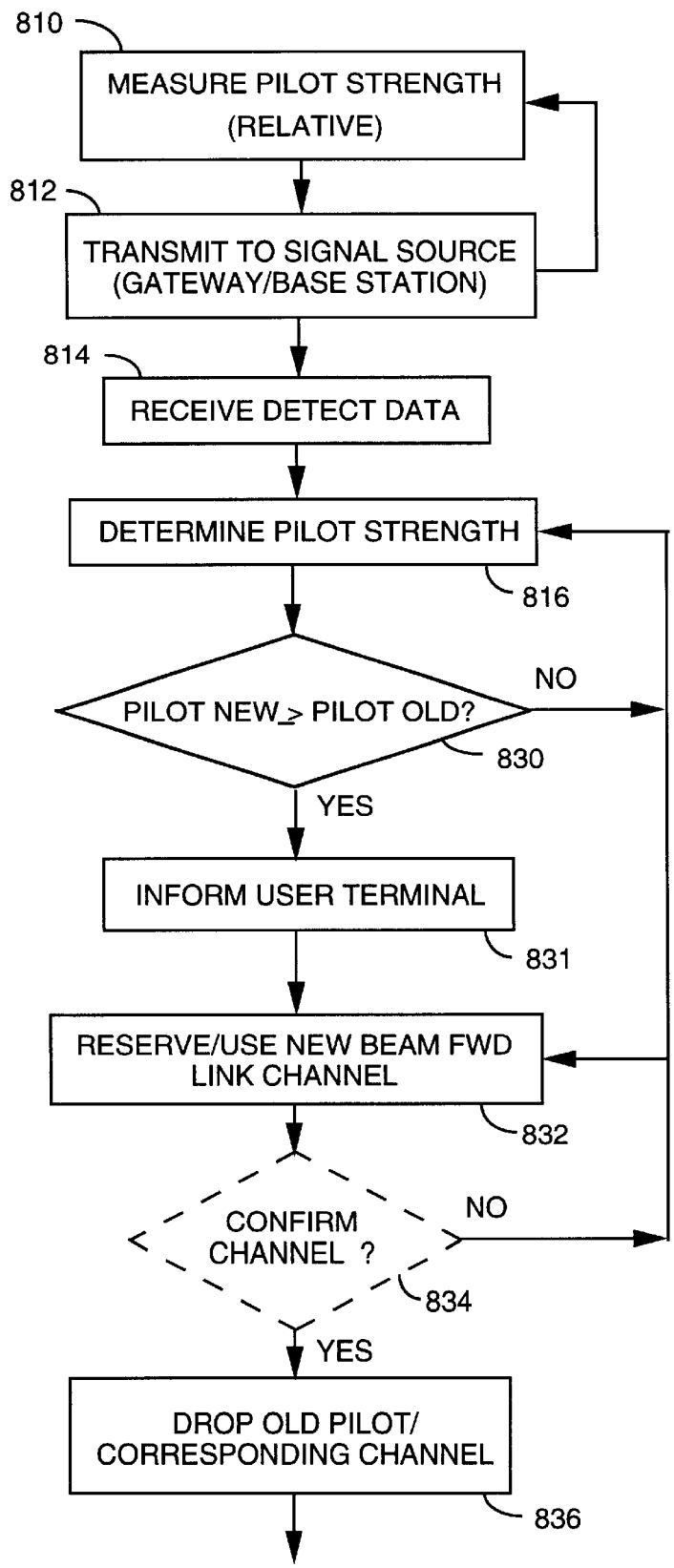
FIG. 8 illustrates additional steps used in the handoff process of FIG. 7 when the signal source determines pilot strength.

In FIG. 8, as before, a user terminal measures the pilot signal strength in a step 810. This is generally accomplished by integrating received pilot signal chip energies over a preselected time interval, such as a symbol period, in a data receiver. This information is generally already available as part of various known signal demodulation and tracking schemes used by user terminals. The information is then temporarily stored, as desired, and either embedded in or appended to other communication signals or transferred as a separate pilot information signal to the signal source, either a gateway or base station, in a step 812.

Gateways and base stations receive such signals containing signal strength information in a step 814, and extract the data, using techniques known in the art. The information is either automatically or easily associated with corresponding user terminals and beams. The gateway then uses this information, along with known transmission power levels and relative differences for pilot signals being transmitted in a step 830 to determine the relationships between pilot signals being detected or received by the user terminal. That is, to see if the new pilot signal strength exceeds the old. This allows the gateway or base station to determine relative power levels and when beam or sector boundaries are being traversed. This information can then be transmitted back to the user terminal as part of various known signals in a step 831.

The gateway establishes a new channel for the user terminal to use in a step 832, having determined when one is desired, in accordance with known capacity limitations, or various channel assignment procedures and schemes. The user terminal will then confirm proper operation of the new channel as before in a step 834, or the gateway can use certain known feedback mechanisms or predefined transmit-and-receive test signals to confirm channel operation, before dropping the old channel in a step 836. Depending upon the level of signal synchronization established in setting up the new channel, step 834 can be optional, as discussed below. This then is a "passive" handoff technique.

The gateway or base station can receive periodic reports of pilot signal strength from user terminals, either in response to transmitted messages requesting such information, or at preselected reporting intervals. The gateway can update and maintain signal strength information to predict when user terminals approach various coverage area boundaries.

An advantage of this approach is that any computation resources are limited in terms of apparatus and processing time consumed by a user terminal. Resources can be more easily and cost effectively implemented in base stations and gateways. Another advantage of this approach is that it allows an alternative embodiment that can be referred to as a "firm" or "synchronized" soft handoff technique.

Because the gateway or base station is maintaining data on pilot signal strength from each user terminal, transitions across beam and sector boundaries can be detected very accurately and quickly. Therefore, the gateway can be fully prepared to communicate with a user terminal on multiple beams or sectors (adjacent) to allow rapid changing of channels or channel assignments for a user terminal. The multiple forward link communication paths are fully controlled by the gateway, in combination with central control centers, and all synchronization, timing, and code use issues can be completely resolved in advance of when a handoff to a new beam or sector is desired. Therefore, the gateway can switch the user terminal communications link or path and drop the use of the traffic signal associated with the first pilot and associated signals or beam virtually instantly.

Another problem may occur as a result of "roll-off" near beam or cell edges or boundaries. As with any signal, but more importantly here the pilot signal, there is an increasingly sharp drop off near the outer edges of a beam. This is a natural result of the power versus distance relationship for signals, as well as beam forming systems. In satellite systems, the impact is exaggerated in outer beams in the satellite spot. That is, due to the larger displacement of these beams from a central area, the rate of decrease in signal amplitude at outer edges of the beams may be much more noticeable than for inner beams.

Roll-off is also increased or exaggerated by certain well known Power Field Density (PFD) requirements or restrictions placed on satellite signals. In order to reduce certain types of signal interference, a limitation is placed on the power density of signals projected from satellites. This limitation has its greatest impact near the far edges of satellite spots, and some form of compensation is generally implemented in the beams near the outer edges. This compensation further reduces incident power in these areas in order to stay within dictated guidelines. Unfortunately, such adjustments greatly increase the rate of power roll-off.

Unfortunately, reduced power in pilot signals also reduces that ability to use them to demodulate paging, traffic, and other signals. Since there is a desire to maintain or increase system capacity across the total service area of the beams, one technique to counter signal drop-off is to boost the pilot signal power as it is directed to outer beams or beam boundaries. This can be referred to as a "pilot adjust" technique, and provides a corresponding improvement in signal reception, tracking, demodulation and so forth increasing the number of system users near boundaries.

However, the use of pilot boosting or level adjustments of any type, including decreasing levels where desired, masks the true beam and sector boundaries. That is, what is normally thought of as "true" beam boundaries will be virtually changed or shifted for a system that uses pilot signal strength to account for or detect such boundaries. If the pilot signal level is boosted to have an artificially compensated or stronger level near a particular boundary, the detection mechanism incorrectly determines that a boundary is either closer or farther away than it should, based on typical signal roll-off, depending on direction of travel and pilot level controls in adjacent beams.

Where "pilot adjustment" is utilized, the handoff method of the present invention can employ a "pilot-adjust" command or designation technique to allow the user terminal to more accurately and correctly determine the relative position of beam and sector boundaries. That is, the use of "pilot adjustment" is denoted as part a communication signal sent to the user terminal for each corresponding beam. This can be done by again embedding or appending a command as part of a paging or traffic signal, or at certain locations within pilot signals and so forth. This information allows a user terminal to compensate to some degree for the pilot boost being used. This approach can be made more useful by also providing some relative indication of the amount of boost used, which can occur in predefined steps if desired.

In the alternative, where the gateway or base station is computing various pilot strength relationships, the pilot boost information is already available within the gateway or base station for each beam. This process can also allow some adjustment to the pilot adjustment itself, if a large number of user terminals are making transitions and there are any problems.

Figure 9:
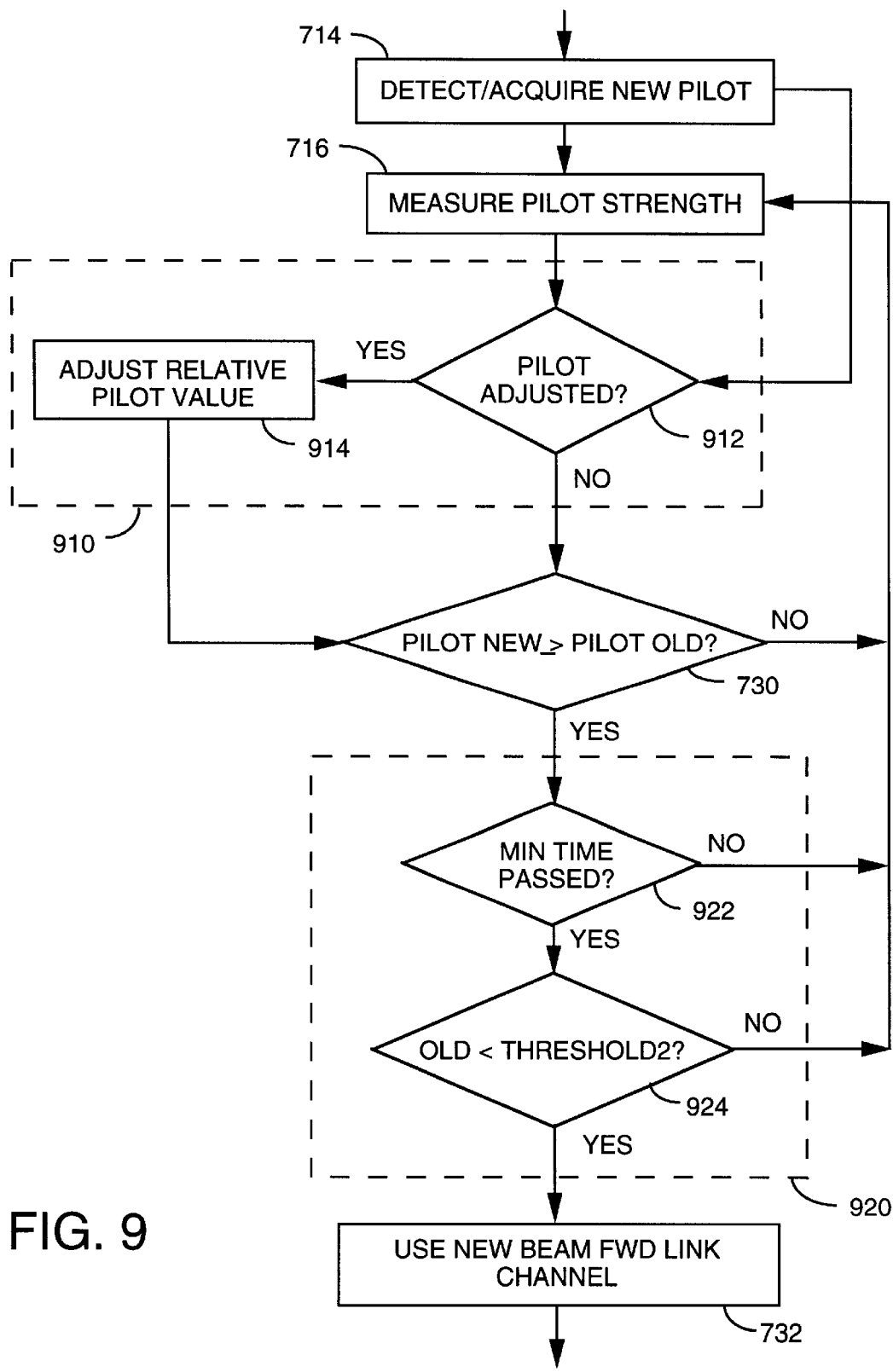
FIG. 9 illustrates additional steps used in the handoff process to account for pilot power adjustments and to implement hysteresis.

Use of such "pilot-adjust" commands and processing is shown in FIG. 9, where a pilot signal level adjustment process 910 (dashed outline) is shown occurring between steps 716 and 730, normally used to measure and compare pilot signal levels. Process 910 can occur before or after first threshold test step 720 in FIG. 7, or strength determination step 816 shown in FIG. 8, as well.

In process 910, a determination is made in a step 912 as to whether or not the pilot has been adjusted. The step 912 determination uses information available to either a user terminal, or gateway and base station. Where there is no pilot adjust, signal processing after step 912 occurs as before, without benefit of any correcting adjustment. Where no information is available regarding pilot adjustment, the answer obtained in step 912 also indicates no adjustment. Where the pilot is known to have been adjusted, the level of the pilot is re-adjusted or counter-adjusted in a step 914 to make a more accurate comparison possible in steps 730 and 830. The amount of adjustment imparted to the pilot may be specified in advance or use dynamically varying information.

The above embodiments of the new handoff process result in only one of the beams being used for forward link signals, with corresponding channel codes and satellite energy, a majority of the time. Two beams are used for only a very brief time, while maintaining the advantage of a soft handoff approach to prevent loss of communications. The operation of the present invention leads to what can be termed as either a "quick" soft handoff technique or a "firm" handoff technique.

While the above embodiments represent improvements over current handoff signal processing techniques, there is one occasion when some system resources may still be wasted. This situation occurs when a user terminal path is directed along a common chord for two neighboring beams. That is; where the user terminal is traversing a path that places the user terminal substantially equidistant from the boundaries of two (or more) neighboring beams being traversed. This also occurs where a user terminal is substantially equidistant from the boundaries of two sectors. A similar problem also occurs when a course followed by the user terminal repetitively crosses adjacent boundaries on a relatively short time scale.

These processes are illustrated in FIGS. 6a, 6b, and 6c. In FIG. 6a, a portion 612 of the user terminal path 610 is equally balanced between the adjacent beam boundaries. In FIGS. 6b and 6c, portion 622 of path 620, and portions 632 of path 630 are shown wandering back and forth between adjacent beam and sector boundaries.

In these situations, the user terminal may never have a clearly stronger pilot signal, or the second pilot strength does not consistently exceed the first for more than brief periods. In both of these instances, the user terminal may switch back and forth between two pilots and beams or sectors, as they just meet the threshold criteria, but only for brief periods of time, on the order a few seconds. This causes the user terminal and gateways or central controllers to consume precious processing time in switching channels and beams, and redirecting communication signals. In addition, frequent shifting between beams or sectors, reduces the period of single beam coverage, effectively producing the current problematic soft handoff scheme.

To minimize the inefficient use of system resources, and prevent a user terminal near a transition point or within a transition region for extended periods of time from changing beams frequently, a form of hysteresis can be built into the pilot signal processing. The use of hysteresis in illustrated in FIG. 9, where a hysteresis process 920 has been inserted between pilot level determination step 730 and beam use step 732. As will be readily apparent to those skilled in the art, process 920 can also occur after comparison determination step 730 in FIG. 7, or determination step 830 shown in FIG. 8.

Hysteresis process 920 can be accomplished for example by requiring in a step 912 that the user terminal use a current pilot signal, or associated beam or sector channels, for a minimum length of time, subject to certain preselected minimum signal strength or potential link loss exceptions. As long as the minimum time has passed, the terminal is allowed to switch beams and pilots and proceed as before. However, if the time test fails, the new beam cannot be selected at this point, in spite of passing other threshold tests.

In some embodiments, each pilot signal being used can be identified and its identification or relevant characteristics recorded by the user terminal controller in some memory location. For example, a specific spreading code being used, or some other known beam or pilot specific identification feature, such as predefined beam "IDs", can be detected. This information can be used by a user terminal, such as through a searcher receiver, to determine if the same pilot is being detected again within a short period of time. The user terminal can use known internal clocks or timing circuits along with memory elements to record the length of time a particular pilot or corresponding traffic signal has been in use.

Therefore, steps can be taken to minimize the frequency with which or minimum time interval over which a beam or sector can be re-selected. The period of time for which a beam or sector must be used before another can be selected, or minimum time before a pilot selection can be "repeated" can be determined in advance by communication system designers from the overall amount of system resources expected to be available, and other known criteria. The user terminal is provided this information when setup to operate within the system, but this information may be updated as part of various system overhead information in transmitted signals.

An alternative or adjunct to using a time requirement, as in step 912, is to employ a minimum change in signal strength requirement in a step 914. In this mode of operation, the current pilot signal is required to decrease below a pre-selected second threshold before a new pilot signal is selected. That is, the pilot signal strength must decrease below some percentage of the value used to select that pilot before another pilot is used as the basis for switching to a new beam or sector service area. This requirement forces the user terminal to stay with a viable communication link longer and not switch beams until the user terminal is clearly moving deeper into a new beam, and not simply skirting the edge of a new beam in some more transient manner.

Using the above techniques, a user terminal can efficiently select pilot signals and move between beams being projected by a single satellite, without losing communications, yet using a minimum amount of system resources. Likewise, a user terminal can effectively select pilot signals while moving between adjacent sectors in a cell. Transmitted power, which is one of two primary limitations on system user capacity, is minimized, for a given signal to noise ratio, on the ground for satellites, if all of the power is diverted into beams with larger signal strength.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for performing handoff between adjacent service areas in a wireless communication system that transfers communication signals using at least one central communications station which establishes geographical service areas for user terminals operating within the system, comprising the steps of:

detecting a physical transition of a user terminal between a first service area and a second adjacent service area, each established by said one central communications station, by detecting signal strength for signals from said adjacent service areas;

requesting a forward link channel for use by said user terminal in said second service area, while said user terminal also communicates using said first service area for forward link communications, when a detected signal strength for the second adjacent service area at least equals that of said first service area;

inspecting values for at least one pre-selected communication parameter, and prohibiting execution of said requesting step when a minimum change in value has not occurred for said parameter since a new forward link channel was previously requested for said user terminal;

confirming that said forward link channel for said second service area is operating according to a pre-selected minimum quality level; and disengaging use by said user terminal of the forward link for said first service area upon confirmation of said pre-selected minimum quality level.

2. The method of claim 1 wherein said step of inspecting comprises the step of determining when a pre-selected minimum period of time has passed since a new forward link channel was previously requested for said user terminal.

3. The method of claim 1 wherein said step of inspecting comprises the step of determining when a pre-selected minimum signal level has been measured for a current service area signal before executing said requesting step.

4. The method of claim 1 further comprising the steps of:
storing identifying information in a memory location for each service area used, up to a predetermined maximum number of such service areas, and for a predetermined maximum length of time; and
comparing newly detected and stored identification information for service areas to determine if a same service area is being detected again within said length of time.

5. Apparatus for performing handoff between adjacent service areas in a wireless communication system in which system users transfer communication signals using at least one central communications station which establishes geographical service areas for user terminals operating within the system, comprising:
means for detecting a physical transition of a user terminal between a first service area and a second adjacent service area, each established by said at least one central communications station, by detecting signal strength for signals from said adjacent service areas;
means for requesting a forward link channel for use by said user terminal in said second service area, while said user terminal also communicates using said first service area for forward link communications, said request being made when a detected signal strength for the second adjacent service area at least equals that of said first service area;
means for disengaging use by said user terminal of the forward link for said first service area when said forward link channel for said second service area exceeds a pre-selected minimum quality level; and
hysteresis means for inspecting values for at least one pre-selected communication parameter, and prohibiting transfer of a new channel request when a minimum change in value has not occurred for said parameter since a new forward link channel was previously requested for said user terminal.

6. The handoff apparatus of claim 5 wherein said hysteresis means determines when a pre-selected minimum period of time has passed since a new forward link channel was previously requested for said user terminal.

7. The handoff apparatus of claim 5 wherein said hysteresis means determines when a pre-selected minimum signal level has been measured for a current service area signal before requesting a forward link channel for said user terminal.

8. The handoff apparatus of claim 5 further comprising:
a memory in which identifying information for each service area used, up to a predetermined maximum number of such service areas, is stored for a predetermined maximum length of time; and
means for comparing stored and newly detected identification information for service areas to determine if a same service area is being detected again within said length of time.

* * * * *